(12) United States Patent
Weisselberg

(10) Patent No.: US 8,464,437 B1
(45) Date of Patent: Jun. 18, 2013

(54) APPARATUS AND METHOD FOR THE TREATMENT OF BIOSOLIDS

(75) Inventor: Edward Weisselberg, Kinnelon, NJ (US)

(73) Assignee: Wyssmont Company Inc., Fort Lee, NJ (US)

( * ) Notice: Subject to any disclaimer, the term of this patent is extended or adjusted under 35 U.S.C. 154(b) by 0 days.

(21) Appl. No.: 13/480,732

(22) Filed: May 25, 2012

(51) Int. Cl.
F26B 11/00 (2006.01)

(52) U.S. Cl.
USPC ............ 34/384; 34/468; 34/497; 422/227.01; 44/605; 44/629; 110/219; 110/224; 201/14; 202/709

(58) Field of Classification Search
USPC ............ 34/77, 379, 381, 384, 413, 468, 497; 422/227.01; 44/505, 550, 605, 629; 110/218, 110/219, 224; 201/14; 202/89, 96, 109
See application file for complete search history.

(56) References Cited

U.S. PATENT DOCUMENTS

| | | | | |
|---|---|---|---|---|
| 2,050,477 | A * | 8/1936 | Weisselberg | 34/164 |
| 2,782,844 | A * | 2/1957 | Weisselberg | 159/18 |
| 3,777,409 | A | 12/1973 | Weisselberg et al. | |
| 5,188,741 | A * | 2/1993 | Zang et al. | 210/774 |
| 5,242,601 | A * | 9/1993 | Manchak et al. | 210/711 |
| 5,279,637 | A * | 1/1994 | Lynam et al. | 71/12 |
| 5,428,906 | A * | 7/1995 | Lynam et al. | 34/379 |
| 5,557,873 | A * | 9/1996 | Lynam et al. | 34/379 |
| 6,754,978 | B1 * | 6/2004 | Adams et al. | 34/361 |
| 7,195,425 | B2 * | 3/2007 | Myers | 405/129.9 |
| 7,883,884 | B2 * | 2/2011 | Bonde et al. | 435/236 |
| 8,003,833 | B2 * | 8/2011 | Appel et al. | 585/240 |
| 2004/0065610 | A1 * | 4/2004 | Shankar et al. | 210/602 |
| 2010/0083530 | A1 * | 4/2010 | Weisselberg et al. | 34/505 |
| 2010/0196199 | A1 | 8/2010 | Vonplon et al. | |
| 2010/0287826 | A1 * | 11/2010 | Hoffman et al. | 44/605 |
| 2011/0138646 | A1 * | 6/2011 | Weisselberg | 34/284 |
| 2012/0073159 | A1 * | 3/2012 | Weisselberg et al. | 34/468 |
| 2012/0316376 | A1 * | 12/2012 | Medoff | 585/469 |

FOREIGN PATENT DOCUMENTS

| | | | |
|---|---|---|---|
| EP | 1990106 A1 | * | 11/2008 |
| JP | 2003290738 A | * | 10/2003 |
| WO | WO 9208770 A1 | * | 5/1992 |
| WO | WO 9411085 A1 | * | 5/1994 |
| WO | WO 2010087660 A2 | * | 8/2010 |

OTHER PUBLICATIONS

Health and Safety Executive Operational Circular, "Sewage Suldge Drying Plant", Jul. 13, 2001.
Stadig William P., "Vertical rotary-tray dryer cuts waste studge problems", Chemical Processing, Aug. 1993.

* cited by examiner

*Primary Examiner* — Stephen M. Gravini
(74) *Attorney, Agent, or Firm* — Lerner, David, Littenberg, Krumholz & Mentlik, LLP

(57) ABSTRACT

Biosolids in the nature of sewage sludge is processed in a controlled environment to produce a dried sludge product of relatively high dry solid content with the elimination of or reduced levels of pathogens. The water containing sewage sludge is dried while cascading within a processing chamber using heated air at a temperature below the ignition or smoldering temperature of the sewage sludge to prevent the formation of embers. The sewage sludge before discharge is retained within the processing chamber for a sufficient time and temperature as mandated by the Environment Protection Agency rules and guidelines.

8 Claims, 5 Drawing Sheets

APPARATUS AND METHOD FOR THE TREATMENT OF BIOSOLIDS

BACKGROUND OF THE INVENTION

The present invention relates in general to an apparatus and method for the treatment of biosolids, and more particularly, to an apparatus and method for the reduction and/or destruction of pathogens in sewage sludge to reduce health risks to humans and animals associated with the disposal of dried sewage sludge.

Sewage sludge also known as biosolids is a solid, semi-solid, or liquid residue generated during the treatment of domestic sewage in special treatment devices. Sewage sludge includes, but is not limited to, domestic septage; scum or solids removed in primary, secondary, or advanced waste water processes; and a material derived from sewage sludge. Sewage sludge does not generally include ash generated during the firing of sewage sludge in a sewage sludge incinerator or grit and screenings generated during preliminary treatment of domestic sewage sludge in the treatment device.

Domestic septage is either liquid or solid material removed from a septic tank, cesspool, portable toilet, Type III Marine sanitation device, or similar treatment device that receives only domestic sewage. Domestic septage does not generally include liquid or solid material removed from a septic tank, cesspool, or similar treatment device that receive either commercial waste water or industrial waste water, and does not generally include grease removed from a grease trap at a restaurant. Domestic sewage is generally waste and waste water from humans or household operations that is discharged to or otherwise enters a treatment device.

Sewage sludge treatment has been known to include three basic processes: preliminary treatment, primary settlement, and secondary treatment. Preliminary treatment involves grit removal and screening to remove larger material such as rags, towels, etc. In primary settlement, the sewage sludge flows through large tanks where smaller organic material is allowed to drop out. During the secondary treatment stage, the mixed liquor is aerated to aid bacteria in breaking down its mass, after which the resulting secondary sludge is allowed to settle. The sludge produced by the primary settlement process and the secondary oxidation process is combined to form the untreated sludge often known as raw sludge. This raw sludge can then be fed directly to a dryer or to a digester for further digestion by anaerobic or aerobic bacteria after which it can be fed to a dryer. Prior to drying the raw sludge is dewatered. Free water is removed by mechanical means such as a belt press or centrifuge to achieve around 30% dry solids. The material produced is referred to as sludge cake, which may be stored for later transportation to another site for drying. The sludge now passes to a dryer for removal of the remaining water to produce the finished product, normally 90-95% dry solids.

Drying can be accomplished either by convection drying when hot gas/air is blown through or over the sewage sludge or by conduction drying whereby the sewage sludge is brought into contact with a heated surface. In the case of convection drying, the gas (air) flowing through the dryer can be heated directly or indirectly. With direct heating, the hot waste gas (oxygen depleted) from a combustion chamber is fed into the dryer, while with indirect heating, air is heated via a heat exchanger. With conduction drying, heat is usually provided by either steam or from a hot oil system. The dryer can have various combinations of heated jackets and hollow paddles/discs through which the heating medium flows. There are various types of known thermal dryers such as: (1) horizontal drum dryers (e.g., rotary dryers, paddle dryers, and thin film dryers); (2) vertical tray dryer-pelletizers; (3) conveyor belt dryers; and (4) fluidized bed dryers.

Sewage sludge is known to contain pathogens which are disease causing organisms such as certain bacteria, viruses, and parasites. These pathogens when present in the dried sewage sludge may be dangerous to humans and other animal life. Sewage sludge often attracts rodents, flies, mosquitoes, or other organisms capable of transporting infectious agents.

In 1993, the U.S. Environmental Protection Agency (EPA) promulgated rules to ensure public safety in the treatment and handling of sewage sludge. In particular, the EPA issued rules known as "Part 053 Rule" and described in EPA publications EPA/625/R-92/013 (December 1992) and entitled "Control of Pathogens and Vector Attractions in Sewage Sludge"; EPA/832-B-92-005 entitled "Domestic Septage Regulatory Guidance: A Guide to the EPA 503 Rule," and EPA/832/R-93/003 (September 1994) entitled "A Plain English Guide to the EPA Part 503 Biosolids Rule." Particularly, Chapter 5 of EPA/832/R-93/003 entitled "Pathogen and Vector Attraction Reduction Requirements" addresses treatment of biosolids to address pathogens.

Accordingly, despite the known drying equipment and methods for treatment of pathogen containing sewage sludge, there remains the need for improvements, for example, an apparatus and method which enables the processing of pathogen containing sewage sludge under the EPA Rules and guidelines.

SUMMARY OF THE INVENTION

In accordance with one embodiment of the invention, there is disclosed an apparatus for the treatment of sewage sludge, comprising: a housing having a sidewall forming a processing chamber; a plurality of vertically spaced apart supports for receiving sewage sludge cascading through the processing chamber; a source of heated gas in communication with the processing chamber for treatment of the sewage sludge cascading through the processing chambers; and a manifold coupled to the sidewall for supplying the heated gas to a plurality of locations within the processing chamber, the manifold including an elongated opening configured for discharging the heated gas into the processing chamber, and at least one barrier partially obstructing the discharging of the heated gas from the opening into the processing chamber.

In accordance with another embodiment of the invention, there is disclosed an apparatus for the treatment of sewage sludge, comprising: a housing having a sidewall forming a processing chamber having an upper portion and a lower portion, the housing having a diameter; a plurality of vertically spaced apart trays arranged within the upper and lower portions of the processing chamber for receiving sewage sludge cascading through the processing chamber; a source of heated gas in communication with the upper and lower portions for the treatment of sewage sludge within the plurality of trays; a manifold coupled to the sidewall for supplying the heat gas to the upper and lower portions of the processing chamber, the manifold including an elongated opening configured for discharging heated gas into the upper and lower portions in a direction transverse to the diameter of the housing, and at least one barrier within the opening for partially obstructing the discharging of heated gas from the opening into the processing chamber; and an outlet for exiting exhaust gas from within the upper and lower portions formed while treating the sewage sludge therein.

In accordance with yet another embodiment of the invention, there is disclosed an apparatus for the treatment of sewage sludge containing a pathogen, comprising: a housing including a sidewall having an inner surface forming a processing chamber having an upper portion and a lower portion, the housing having a diameter; a plurality of vertically spaced apart rotatable trays arranged within the upper and lower portions of the processing chamber for receiving sewage sludge cascading through the processing chamber; a source of heated air in communication with the upper and lower portions for the treatment of sewage sludge within the plurality of trays; a manifold coupled to the sidewall for supplying the heat air to the upper and lower portions of the processing chamber, the manifold including an elongated opening configured for discharging heated air into the upper and lower portions in a direction parallel to the inner surface of the sidewall and perpendicular to the diameter of the housing, and at least one barrier within the opening for partially obstructing the discharge of heated air from the opening into the processing chamber; at least one leveler associated with one of the supports for leveling sewage sludge received therein, wherein the barrier is arranged in alignment with the at least one leveler; an outlet for exiting water vapor from within the upper and lower portions formed while treating the sewage sludge therein, and a controller for controlling the temperature of the heated air below the ignition or smoldering temperature of the sewage sludge.

In accordance with yet still another embodiment of the invention, there is disclosed a method for treatment of sewage sludge containing a pathogen, comprising: cascading sewage sludge containing water and at least one pathogen between a plurality of vertically spaced apart supports within a processing chamber; heating the sewage sludge while cascading within the processing chamber to remove a portion of the water within the sewage sludge thereby forming a reduced water content sewage sludge; heating the reduced water content sewage sludge for a sufficient time and at a sufficient temperature to reduce the amount of the at least one pathogen within the sewage sludge thereby forming a treated sewage sludge; supplying heated gas to the processing chamber for heating the sewage sludge for removing a portion of the contained water therein and for reducing the amount of the at least one pathogen with the sewage sludge; and controlling the temperature of the heated gas within the processing chamber below the ignition temperature of the sewage sludge to prevent the formation of embers therefrom.

In accordance with yet still another embodiment of the invention, there is disclosed a method for treatment of sewage sludge containing a pathogen, comprising: cascading sewage sludge containing water and at least one pathogen between a plurality of supports vertically stacked within an upper portion and a lower portion of a processing chamber; heating the sewage sludge while cascading between the supports within the upper portion of the processing chamber to remove a portion of the water within the sewage sludge thereby forming a reduced water content sewage sludge; heating the reduced water content sewage sludge within the lower portion of the processing chamber for a sufficient time and at a sufficient temperature to reduce the amount of the at least one pathogen thereby forming a treated sewage sludge; exiting exhaust gas created in the upper and lower portions of the processing chamber; recycling at least a portion of the exhaust gas to the processing chamber for heating the sewage sludge contained therein; supplying heated gas to the upper portion of the processing chamber for removing a portion of the water contained within the sewage sludge and to the lower portion of the processing chamber for reducing the amount of the at least one pathogen within the sewage sludge; and controlling the temperature of the heated gas within the processing chamber below the ignition temperature of the sewage sludge to prevent the formation of embers therefrom.

In accordance with yet still another embodiment of the invention, there is disclosed a method for treatment of sewage sludge containing a pathogen, comprising: cascading sewage sludge containing water and at least one pathogen between a plurality of vertically spaced apart supports within a processing chamber; heating the sewage sludge while cascading within the processing chamber to remove a portion of the water within the sewage sludge thereby forming a reduced water content sewage sludge of at least 90% dry solids; heating the reduced water content sewage sludge at a temperature at least in the range of 50° C. 80° C. and for 20-30 minutes to reduce the amount of the at least one pathogen within the sewage sludge thereby forming a treated sewage sludge; supplying heated air to the processing chamber in the temperature range of 120° C. 175° C. for heating the sewage sludge for removing a portion of the contained water therein; controlling the temperature of the heated air within the processing chamber below the ignition temperature of the sewage sludge to prevent the formation of embers therefrom; and wherein supplying the heated air to the processing chamber further comprises discharging the air into the processing chamber in a direction perpendicular to a diameter of a housing providing the processing chamber.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects and advantages thereof may best be understood by reference to the following detailed description when read with the accompanying drawings in which:

DETAILED DESCRIPTION OF THE PREFERRED EMBODIMENT

Figure 1:
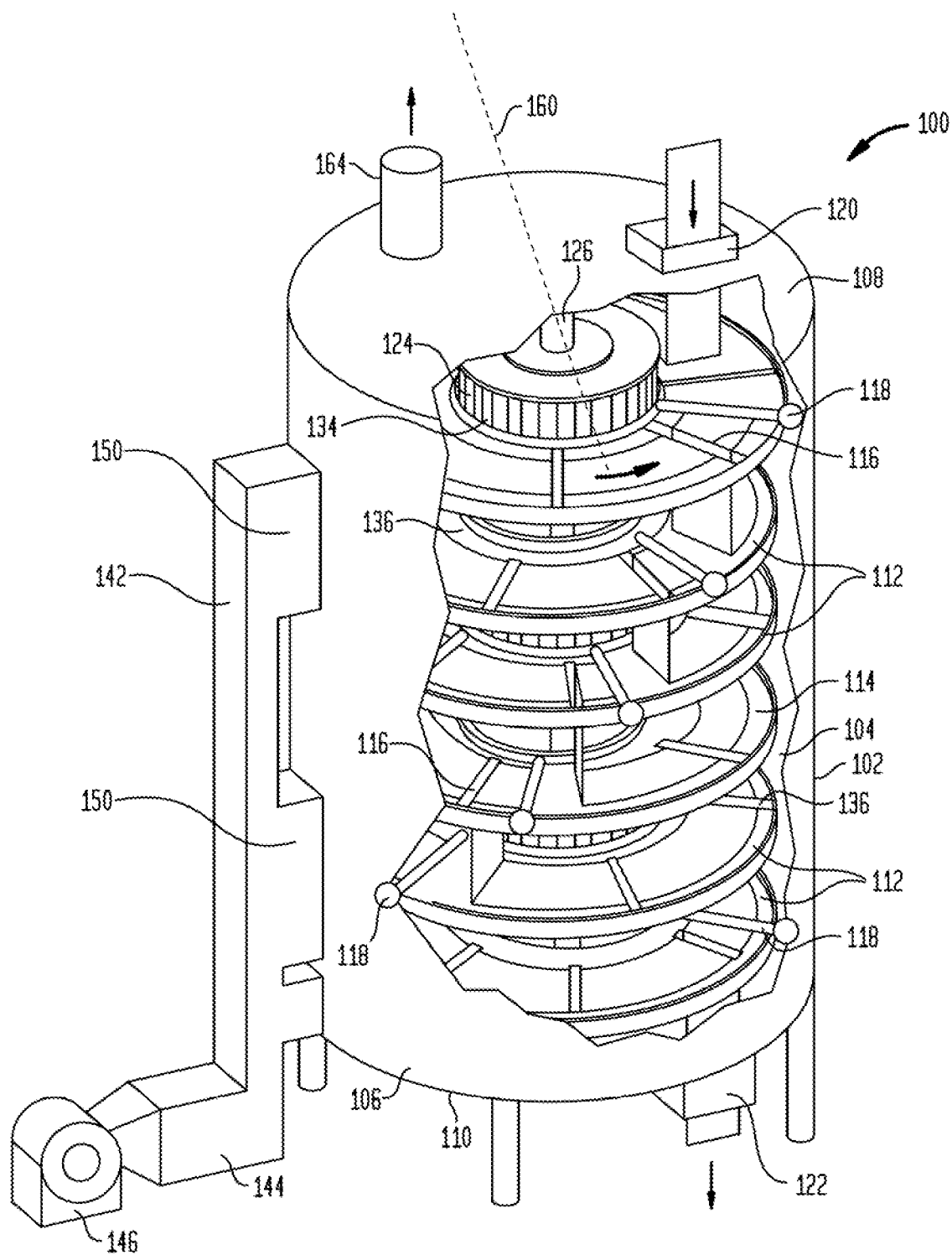
FIG. 1 is a perspective view, with partial cutaway, of an apparatus for the treatment of sewage sludge in accordance with one embodiment of the present invention.

In describing the preferred embodiments of the invention illustrated in the drawings, specific terminology will be used for the sake of clarity. However, the invention is not intended to be limited to the specific terms so used, and it is to be understood that each specific term includes all equivalence that operate in a similar manner to accomplish a similar purpose.

Figure 2:
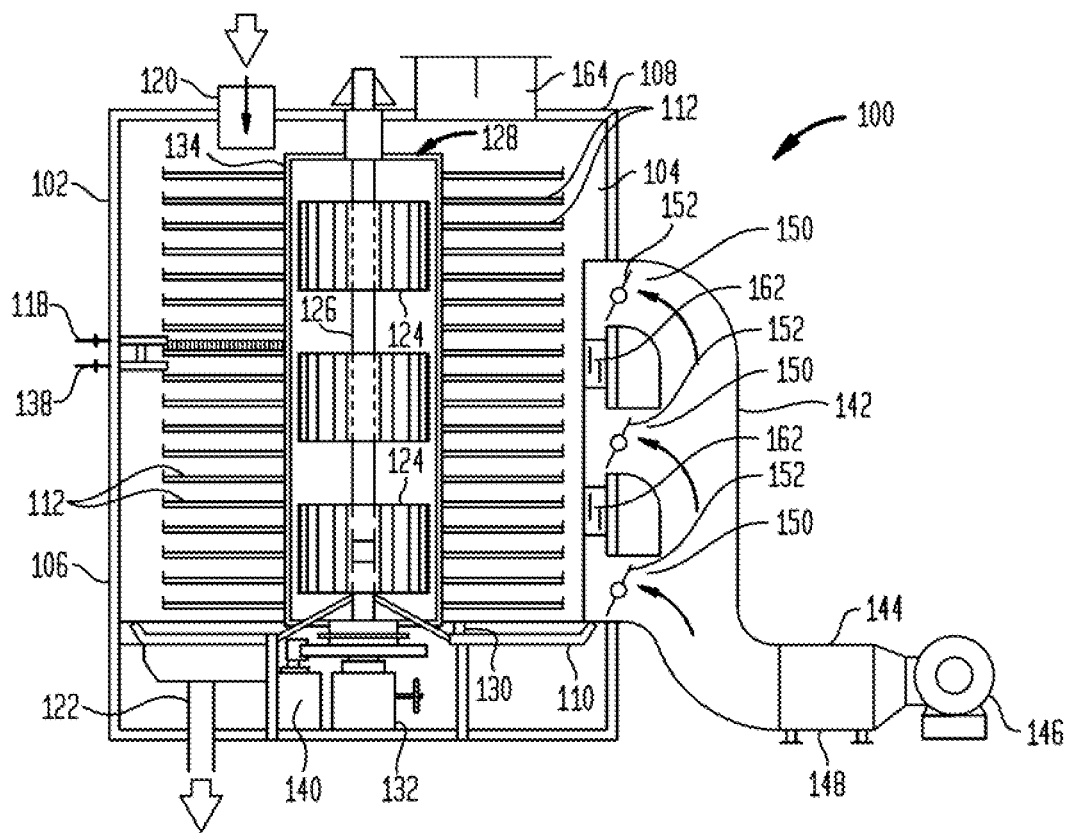
FIG. 2 is a diagrammatic cross-sectional illustration of the apparatus as shown in FIG. 1.

Referring now to the drawings, wherein like reference numerals represent like elements, there is shown in FIGS. 1 and 2 an apparatus 100 constructed for the treatment of sewage sludge in accordance with one embodiment of the present invention. The apparatus 100 processes sewage sludge containing various amounts of water to produce a dried biosolid material having a pathogen content within the EPA guidelines, while effectively eliminating dust fumes and odor during operation thereby producing a dried granular product with no detectable odor.

As shown, a hollow housing 102 forms an internal central processing chamber 104. The housing 102, which may be cylindrical or polygonal or rectangular is constructed from one or more sidewalls 106 which extend around the circumference of the chamber 104, a top wall 108 and a bottom wall 110. The chamber 104 is provided with a plurality of adjacent processing zones extending generally continuously from the top wall 108 to the bottom wall 110, whereby processing of the sewage sludge takes place simultaneously at each of the plurality of treatment zones.

The apparatus 100 may include a variety of types of components for transferring the sewage sludge through the different zones. For example, the apparatus may incorporate a plurality of vertically stacked spaced apart material supports such as trays 112. According to one embodiment, the trays 112 may be divided into one or more segments 114 by means of elongated radially spaced apart openings 116 within the trays. In the preferred embodiment, the trays 112 are formed as an annular shaped structure. The openings 116 allow sewage sludge to pass from one tray to an underlying lower tray in a cascading fashion. For example, the trays 112 may be attached to a rotating structure, and thus may rotate about a substantially vertical axis as the structure rotates. As a result, the sewage sludge will cascade downwardly through the processing chamber 104 from tray to tray.

Cantilever devices such as wipers 118 are optionally arranged extending over the trays 112 to push sewage sludge from the trays through the openings 116 as the trays rotate. Alternatively, the trays 112 may remain stationary, and the wipers 118 may sweep across the trays to discharge the sewage sludge thereon. Accordingly, sewage sludge is transferred from the topmost tray 112 within the processing chamber 104 through the plurality of vertically stacked trays to the lowermost tray within the chamber for ultimate discharge from the apparatus 100. In accordance with one embodiment, each tray 112 may be provided with a plurality of wipers 118 overlying each tray, particularly where there are a plurality of tray openings 116.

The sewage sludge to be processed is supplied to at least one material inlet 120 provided within the top wall 108. The inlet 120 is arranged overlying the topmost tray 112 for distributing the sewage sludge onto the tray. Any number of inlets 120 may be provided for simultaneously feeding sewage sludge into the apparatus 100 for processing. One or more material outlets 122 are provided on the bottom wall 110 for discharging processed sewage sludge from the last most tray 112 in the apparatus 100. Accordingly, any number of material inlets 120 and any number of material outlets 122 may be provided for feeding the sewage sludge to be processed into the chamber 104 and for discharging processed material therefrom.

Referring to FIG. 2, there is illustrated in different detail the construction of the apparatus 100 in accordance with one embodiment of the present invention. Inside the processing chamber 104, the apparatus 100 incorporates the plurality of annular shaped trays 112 arranged one disposed over the other in a vertical stack. This allows the sewage sludge to cascade downwardly with the processing chamber 104 from one tray 112 to the next tray. The trays 112 surround a plurality of vertically aligned fans 124, as to be described hereinafter, attached to a common central fan shaft 126. The fans 124 circulate the atmosphere or environment inside the chamber 104 and over the sewage sludge on the trays 112. Each fan 124 typically covers several trays 112, for example, often trays 6-8, thereby defining one or more processing zones with the apparatus 100.

The sewage sludge to be processed is received on the topmost tray 112 and progressively transferred to the lowermost tray in a cascading fashion. In one embodiment, the sewage sludge may cascade along a linear or spiral path within the processing chamber 104. Each tray 112 may be connected to at least one stanchion 128, wherein several stanchions are positioned around the fan shaft 126, thereby forming a squirrel type cage. Coupled to the stanchions 128 is a turntable 130 at the lower end of the chamber 104. According to one embodiment, the turntable 130 is connected to the rotatable cage structure which surrounds the fan shaft 126. At least one drive assembly 132 including a plurality of gears causes the turntable 130 to rotate, thereby causing the stanchions 128 and the trays 112 to revolve.

Referring to FIG. 1, the trays 112 are generally planar in nature having an annular shape provided by a central opening 134. In the preferred embodiment, the trays 112 include a single radially extending slot like openings 116. The opening 116 is sized to permit the sewage sludge being processed on the tray 112 to be discharged therefrom as to be described hereinafter. In other embodiments, it is contemplated that each tray 112 can be divided into any number of tray segments by including a plurality of radially extending slot-like openings 116. The construction of such a tray 112 is disclosed in co-pending application Ser. No. 13/183,671 entitled "Multi-Stream Material Processing Apparatus," the disclosure of which is incorporated herein by reference.

The outer and inner circumferential edges of the trays 112 are provided with a raised lip 136 dimensioned in height so that each of the trays will contain a volume and layer thickness of sewage sludge being processed. The specific height of each lip 136 is generally dependent upon the particular nature of the sewage sludge being processed. Thus, in cases where thin layers of sewage sludge are desired, the height of the lips 136 will be relatively shallow. In the alternative, where thicker layers of sewage sludge are to be processed, the height of the lips 136 will be greater. Accordingly, the thickness of the sewage sludge to be processed can be varied in the apparatus.

A rigidly mounted leveler 138 is optionally provided assembled adjacent each tray 112 to brush across the top surface of the sewage sludge placed on the tray, thereby leveling the material and exposing material underneath the top portion to the environment within the chamber 104. Any number of levelers 138 may be positioned circumferentially around the trays 112. It is not required that every tray 112 have a leveler 138. For example, the first few trays where the sewage sludge is somewhat pasty, levelers might not be provided. Sewerage sludge that may be spilled by the wipers 118 or levelers 138 over the sides of the trays 112 fall onto an optionally provided catch plate (not shown). The catch plate, if provided, is angularly positioned with respect to the trays 112 to cause sewage sludge which is spilled off of a tray above to fall onto the catch plate and be directed onto a tray below. In this manner, the sewage being processed in the chamber 104 cascades downwardly from the upper tray 112 to a lower tray.

As the sewage sludge is being moved through the chamber 104 as thus far described, further elements may be implemented within the chamber to aide in processing. For example as previously described, several fans 124 may be included within the chamber 104 to facilitate circulation of the environment such as heated air or gas, reactive and/or inert gases, as well as other environmental gases such as steam.

The fans 126 are effective to provide a more even temperature profile or environment within the chamber 104. The fans 124 may be connected to the fan shaft 126 by any suitable means such as keys. The fan shaft 126 extends through the bottom plate 110 of the apparatus 100 where it connects to a drive assembly 140, such as through a gear reducer at its lower end. The fans 124 may be powered such as by motor, or by other power sources such as hydraulic, steam, gas, or the like. As the drive assembly 140 causes the shaft 126 to rotate, the fans 124 rotate in turn, thus pushing the internal environment within the chamber 104 across the exposed sewage sludge on each of the trays 112.

The sewage sludge is processed within the apparatus 100 by, for example, heated air or gas distributed to the processing chamber 104 through a manifold system 142 in fluid communication with a heat exchanger 144 and an air intake fan 146. The manifold system 142 is coupled to the sidewall 106 of the housing 102. The manifold system 142 includes a conditioned air inlet 148 and at least one conditioned air outlet 150. As shown in FIG. 2, in accordance with one embodiment of the present invention, the apparatus 100 includes a manifold system 142 including three spaced apart conditioned air outlets 150. The outlets 150 are arranged at predetermined locations opposing the trays 112 between the top plate 108 and bottom plate 110 of the apparatus 100. The particular number of outlets 150, their arrangement and location relative to the trays 112, may be varied depending upon the operating conditions intended within the processing chamber 104 for the treatment of sewage sludge therein.

In the preferred embodiment, each of the outlets 150 may include a control damper 152 for controlling the volume of heated air being discharged by the manifold system 142 into the processing chamber 104. Controlling the individual dampers 152 allows for a controllable temperature profile within the processing chamber 104. Each of the dampers 152 may be manually controlled, or in the alternative, be connected to a microprocessor base control system 153 having temperature feedback from thermal couples placed within the apparatus 100. The control system 153 can also control the temperature of the heated air from the heat exchanger 144 and operation of the intake fan 196, including internal fans 124. The control system 153 may be connected to a wired or wireless network e.g., the internet.

Figure 3:
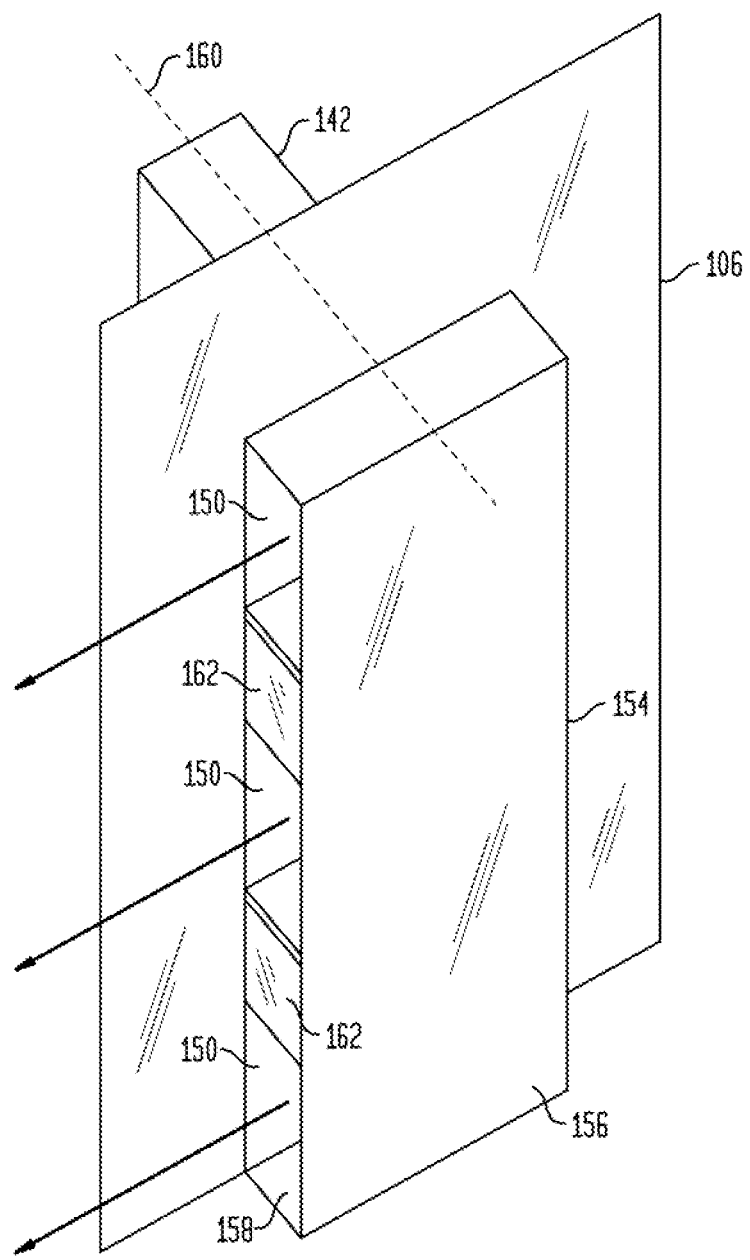
FIG. 3 is a perspective view of a hot gas distribution manifold constructed in accordance with one embodiment of the present invention.

With reference to FIG. 3, the manifold assembly 142 further includes an internal elongated duct 154 within the chamber 104 in communication with each of the outlets 150. The duct 154 includes an end wall 156 generally arranged parallel to the inner surface of the sidewall 106. The duct 154 is open along one side edge forming an elongated opening 158 arranged transverse to the sidewall 106. In the preferred embodiment, the elongated opening 158 is arranged perpendicular to the sidewall 106, and parallel to the flow direction of the heated air discharged through the outlets 150.

In operation, heated air from the blower 146 is heated by the heat exchanger 144 and discharged into the manifold system inlet 148. In turn, the heated air passes through the manifold system 142 and ultimately through the air outlets 150 under the control of the dampers 152, if provided. The conditioned air enters the duct 154 in a direction along the diameter 160 of the apparatus 100 or generally perpendicular to the sidewall 106. Upon entering the duct 154, the direction of the heated air is redirected to be discharged through the opening 158, generally parallel to the inner surface of the sidewall 106 and perpendicular to the diameter 160 of the apparatus 100. Thus, the heated air from the manifold system 142 is discharged into the processing chamber 104 in a direction generally parallel to the sidewall 106, and not directly onto the opposing trays 112. This allows the incoming heated air to be blended internally within the processing chamber 104 with the internal conditioned air to provide a more uniform temperature within the processing chamber. This subjects the sewage sludge being processed on each of the trays 112 to a more uniform temperature distribution than what otherwise might occur if the heated air was discharged directly from an outlet 150 onto an opposing tray.

As previously described, the apparatus 100 may include a plurality of levelers 138 positioned in operative association with the trays 112. Discharging heated air from the manifold system 142 into contact with the levelers 138 can result in the heated air having a turbulent flow pattern which might result in less desirable drying attributes for sewage sludge on associated trays 112. To overcome this issue, in accordance with a preferred embodiment of the present invention, one or more barriers 162 are arranged obstructing certain portions of the elongated opening 158 formed in the duct 154. In general, the barriers 162 are arranged in alignment with and opposing each of the levelers 138 within the processing chamber 104. In addition, the barriers 162 may be positioned opposing other internal obstructions within the processing chamber 104 for a similar purpose.

The sewage sludge being supplied to the apparatus 100 may undergo various processing conditions within the chamber 104. For example, the sewage sludge may initially be subject to drying within an upper portion of the chamber 102 encompassing a plurality of trays 112. The sewage sludge is further processed in a lower portion of the processing chamber 104 in one or more trays 112 to destroy or reduce the amount of pathogens in the dried sewage sludge. Typically, the processing of the sewage sludge within the chamber 104 will be under a selected gas environment. By way of example, various gas environments may include heated air, stream, inert gases, other gases and the like. It is also contemplated that internal heating rods or tubes may be incorporated into the processing chamber 104 as a source of heat for processing the sewage sludge.

The apparatus 100 may be modified to include additional features, systems, and equipment as dictated by the process being performed or other considerations. For example, many sewage sludges are treated using a variety of digestion techniques, the purpose of which is to reduce the amount of organic matter and the number of disease-causing microorganisms present in the solids. The most common treatment options include anaerobic digestion, aerobic digestion, and composting.

Anaerobic digestion is a bacterial process that is carried out in the absence of oxygen. The process can either be thermophilic digestion in which sludge is fermented in tanks at a temperature of 55° C. or mesophilic, at a temperature of around 36° C. Anaerobic digestion generates biogas with a high proportion of methane (including carbon dioxide and hydrogen sulfide) that may be used to both heat the tank and for other on-site processes. Sufficient energy can be generated in this way to produce all or a portion of the heat required for processing the sewage sludge in the apparatus 100.

The treatment of sewage sludge which may contain one or more pathogens using the apparatus 100 will now be described. In the preferred embodiment, sewage sludge is dewatered prior to being fed to the apparatus 100. As previously described, the sewage sludge may be treated by preliminary treatment, primary settlement, and secondary treatment. In the preferred embodiment, and by way of one example only, sewage sludge having a dry solids content from about 30% to about 40% by weight is fed to the inlet 120 of the apparatus 100 by any suitable means, for example, by a screw feeder. It is to be understood that the sewage sludge being fed to the apparatus 100 may have other dry solids content for processing in the apparatus 100. The sewage sludge is processed within the apparatus 100 to increase the dry solids content at the outlet 122 to greater than about 90%, more preferably greater than 92%, and in accordance with the preferred embodiment, in the range of about 96% to 98%. Stated differently, the processed sewage sludge from the apparatus 100 by way of example, will have a dry solid content of at least 90%, preferably above 92%, and more preferably about 98% dry solids.

Heated air is supplied to the processing chamber 104 by means of the intake fan 146 and heat exchanger 144. The air may be heated in the heat exchanger using steam, combustion gases, or electric heat within the chamber 104 as previously noted. By way of example only, the heated air discharged into the processing chamber 104 through the conditioned air outlets 150 is controlled to an inlet temperature in the range of about 150°-175° C. Varying temperatures within the processing chamber 104 to provide a uniform or controlled distribution can be controlled using the dampers 152. In the preferred embodiment, the temperature within the processing chamber 104 is controlled within the range of from about 120°-150° C. However, it is to be understood that these temperatures are only exemplary, and that other temperatures are contemplated.

In general, the temperature near the bottom of the processing chamber 104 is often hotter than the temperature near the top of the processing chamber where the sewage sludge has a higher moisture content. The temperature within the processing chamber 104 is controlled such that the sewage sludge is preferably maintained below its ignition or smoldering temperature to prevent the formation of embers within the dried sewage sludge. The formation of embers can be a fire hazard upon storing the dried processed sewage sludge. The embers, if present, can result in the dried sewage sludge catching fire. As the sewage sludge is heated within the processing chamber 106, water vapor and any flue gases created from the heat treatment of the sewage sludge is discharged from the apparatus 100 by exhaust discharge 164.

After revolution of the top tray 112, the sewage sludge is wiped by means of the wiper 118 onto the next lower tray, where it is mixed, leveled by leveler 138, and then after revolution of the tray, is wiped to the next lower tray where the operation is repeated. In this manner, the sewage sludge cascades downwardly through the processing chamber 104 from one tray 112 to the next underlying tray. As previously described, the trays may be stationary, and the wipers 118 may be rotated to affect discharge of the sewage sludge through openings 116 within the trays. The trays 116, by being contained within the enclosed processing chamber 104, are subject to the heated air or gases that are circulated by the internal fans 124. This approach to drying of the sewage sludge enables an exceptionally gentle handling of the sewage sludge without back-feeding. Combined with the precisely controlled and uniform temperature environment as thus far described, the apparatus 100 produces a consistently odorless sized granular with little dust or fines in a manner that ensures against material smoldering or ignition by not forming embers.

Another approach to preventing fires within the apparatus 100 is the use of an anaerobic gas such as nitrogen. However, if the dried sewage sludge gets overheated even under an inert gas, it can catch fire when exposed to air upon discharge from the apparatus. By controlling the temperatures within the processing chamber 104 as noted hereinabove, the apparatus 100 eliminates the need for the use of nitrogen, while at the same time, avoiding fires and odors that are discharged from the product. In this regard, the apparatus 100 prevents the generation of odor by ensuring that the sewage sludge is not overheated or baked, and that neither the processed sludge nor the trays 112 are exposed to superheated hot air. However, it is contemplated that nitrogen may be used in conjunction with the above described process. It is also contemplated that the apparatus 100 may also be operated under a slight negative pressure, e.g., vacuum in the range of from about 0.01-0.04 inches water, that addresses the issue of dust formation and controlling odors discharged from the apparatus.

Before discharge from the apparatus 100, the dried sewage sludge in the upper trays 112 is processed to destroy and/or to reduce the level of pathogens in complying with the EPA requirements as noted hereinabove, e.g., Part 503 Rule of the above EPA regulations. The described treatment process for sewage sludge requires that the sewage sludge be treated at a predetermined temperature and residence time. To satisfy the temperature and residents time requirements, the EPA in Part 503 Rule provides a time-temperature relationship equation for use in waste treatment facilities. By way of example, the EPA regulations require heating the sewage sludge to a temperature in the range of 50°-80° C. or higher for 20-30 minutes or longer, which is the standard for killing pathogens to meet Class A biosolids requirements. Preferably the sewage sludge is treated by attaining a temperature of 80° C. for 30 minutes. This temperature and residence time requirement can be achieved at least within the lower trays 112 within the processing chamber 104 of the apparatus 100.

Moreover, as noted hereinabove, the processing conditions within the processing chamber 104 maintains the sewage sludge continuously above the EPA temperature requirement, while avoiding overheating of the sewage sludge and at a temperature below the ignition or smoldering temperature to preclude the formation of embers. Thus, the sewage sludge gets exposed to the required temperature and residence time while being processed through the processing chamber 104, while avoiding getting overheated which can potentially produce dust and embers. Prior to discharge of the sewage sludge from the apparatus 100, the lower most trays 112 may be used for cooling the sewage sludge prior to discharge from outlet 122. In the preferred embodiment, the discharged sewage sludge is cooled in a separate unit such as a cooling screw or parallel plate cooler and the like.

Figure 4:
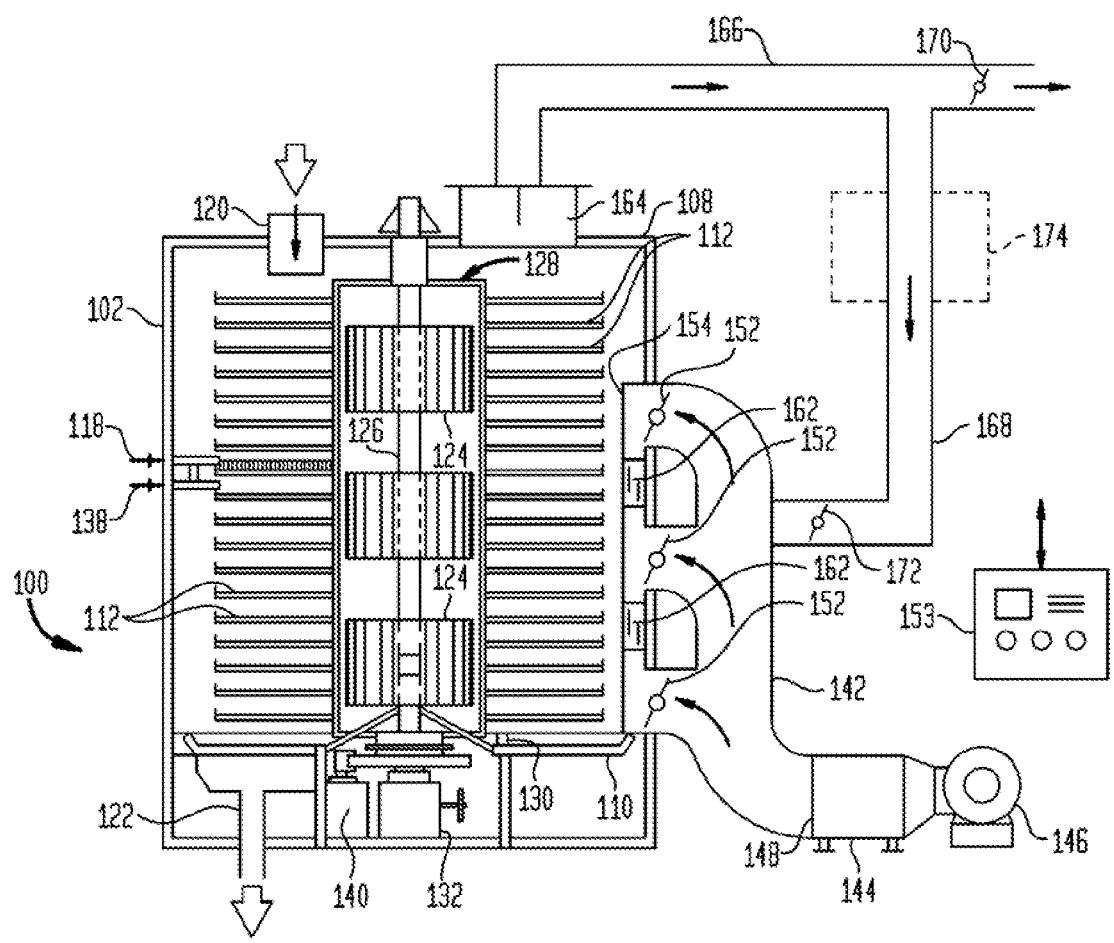
FIG. 4 is a diagrammatic illustration of an apparatus for treatment of sewage sludge in accordance with another embodiment of the present invention.

Referring now to FIG. 4, there is disclosed an apparatus 100 which has been modified pursuant to one embodiment of the present invention. A process chamber exhaust duct 166 is provided in fluid communication with the exhaust discharge 164. The exhaust duct 166 is further in fluid communication with a recycled duct 168 coupled to the manifold system 142. Control dampers 170, 172 may be provided within the exhaust duct 166 and the recycle duct 168. By controlling the dampers 170, 172, the exhaust from the process chamber 104 can be directed to the outside atmosphere via damper 170, or recycled back to the processing chamber through the control damper 172. Thus, a portion or all of the exhaust from the processing chamber 104 may be discharged to the atmosphere or recycled back to the processing chamber. The recycled exhaust provides recovered heat from the processing chamber for operation of the apparatus 100 during treatment of the sewage sludge. Optionally, a condenser 147 may condense a portion of the moisture in the exhaust, or other possible volatiles that may be discharge from the sewage sludge during processing. The condenser 174 may be substituted by other types of equipment such as desiccant dryers and the like.

Figure 5:
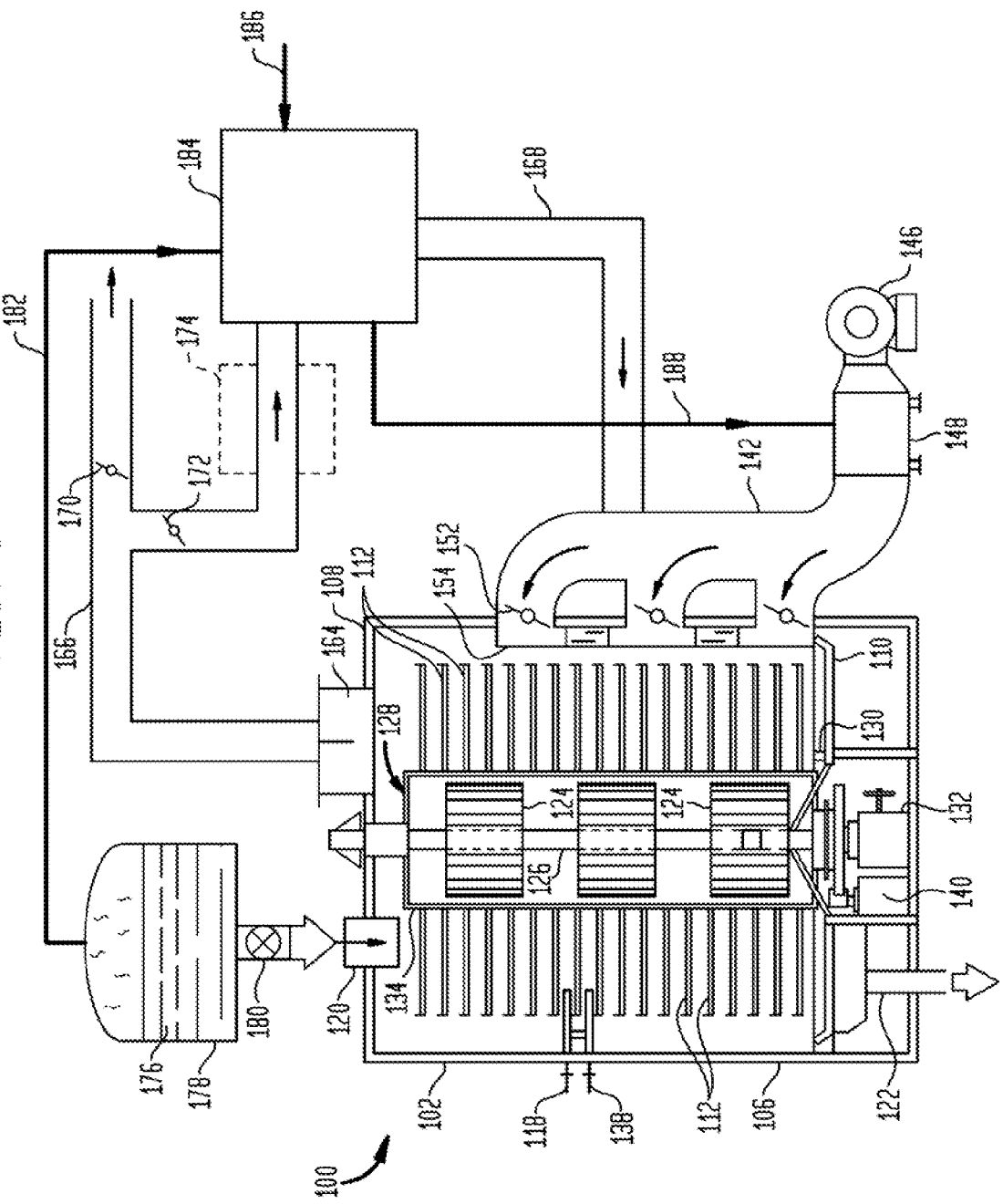
FIG. 5 is a diagrammatic illustration of an apparatus for treatment of sewage sludge in accordance with still another embodiment of the present invention.

Referring to FIG. 5, there is illustrated an apparatus 100 constructed in accordance with another embodiment of the present invention. The sewage sludge 176 is initially processed in an anaerobic digester 178 prior to being fed into the apparatus 100 such as through a control valve 180. The methane gas generated within the digester 178 is fed via a conduit 182 to a heat exchanger/burner 184. The methane gas can be ignited within the burner 184 with supplemental gas supplied via gas inlet 186. The heated flue gas from the combustion can be used for heating a portion of the exhaust being recycled to the processing chamber 104 through the recycled duct 168. In addition, the heated flue gas can be fed via conduit 188 to the heat exchanger 144 for heating the incoming air via fan 146.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for treatment of sewage sludge containing a pathogen, comprising:

cascading sewage sludge containing water and at least one pathogen between a plurality of supports vertically stacked within an upper portion and a lower portion of a processing chamber;

heating the sewage sludge while cascading between the supports within the upper portion of the processing chamber to remove a portion of the water within the sewage sludge thereby forming a reduced water content sewage sludge;

heating the reduced water content sewage sludge within the lower portion of the processing chamber for a sufficient time and at a sufficient temperature to reduce the amount of the at least one pathogen thereby forming a treated sewage sludge;

exiting exhaust gas created in the upper and lower portions of the processing chamber;

recycling at least a portion of the exhaust gas to the processing chamber for heating the sewage sludge contained therein;

supplying heated gas to the upper portion of the processing chamber for removing a portion of the water contained within the sewage sludge and to the lower portion of the processing chamber for reducing the amount of the at least one pathogen within the sewage sludge; and controlling the temperature of the heated gas within the processing chamber below the ignition temperature of the sewage sludge to prevent the formation of embers therefrom.

2. The method of claim 1, wherein the treated sewage sludge has a dry solid content of at least 90% by weight.

3. The method of claim 1, wherein heating the sewage sludge for a sufficient time and at a sufficient temperature to reduce the amount of the at least one pathogen comprises heating the sewage sludge of reduced water content to a temperature in the range of 50° C.-80° C. or higher for a time in the range of 20-30 minutes or longer.

4. The method of claim 1, wherein the temperature comprises 80° C. and the time comprises at least 30 minutes.

5. The method of claim 1, wherein the heated gas supplied to the processing chamber is in the range of 150° C.-175° C.

6. The method of claim 5, wherein the heated air within the processing chamber is controlled within the range of 120° C.-150° C.

7. The method of claim 1, wherein supplying the heated gas to the processing chamber further comprises discharging the gas into the processing chamber in a direction perpendicular to a diameter of a housing providing the processing chamber.

8. The method of claim 1, further including rotating the supports while the sewage sludge cascades within the processing chamber.

* * * * *